US009447369B2

(12) United States Patent
Schaible et al.

(10) Patent No.: US 9,447,369 B2
(45) Date of Patent: Sep. 20, 2016

(54) METHOD AND APPARATUS FOR MAKING SOAP

(71) Applicant: Designed by M.E., LLC, Bellevue, WA (US)

(72) Inventors: Chérie Liana Schaible, Mamaroneck, NY (US); Tami Deanna Lamp, Bellevue, WA (US); Stephen John Gaynes, McHenry, IL (US)

(73) Assignee: DESIGNED BY M.E., LLC, Bellevue, WA (US)

(*) Notice: Subject to any disclaimer, the term of this patent is extended or adjusted under 35 U.S.C. 154(b) by 0 days.

(21) Appl. No.: 14/735,849

(22) Filed: Jun. 10, 2015

(65) Prior Publication Data

US 2015/0361384 A1 Dec. 17, 2015

Related U.S. Application Data

(60) Provisional application No. 62/010,762, filed on Jun. 11, 2014.

(51) Int. Cl.

*C11D 13/16* (2006.01)
*B01J 10/00* (2006.01)
*C11D 13/10* (2006.01)
*C11D 13/02* (2006.01)

(52) U.S. Cl.

CPC ............... *C11D 13/16* (2013.01); *C11D 13/02* (2013.01); *C11D 13/10* (2013.01)

(58) Field of Classification Search

CPC ....... C11D 13/16; C11D 13/02; C11D 13/10; B01J 10/00; B01J 12/00; B01J 14/00; B01J 15/00; B01J 16/00; B01J 19/00; B01J 8/00

USPC .................................. 422/129; 554/156, 158

See application file for complete search history.

(56) References Cited

U.S. PATENT DOCUMENTS 2,136,283 A * 11/1938 Dickinson .............. C11D 13/04 252/367.1
2,300,750 A * 11/1942 Scott ...................... C11D 13/04 252/367.1
2,640,840 A * 6/1953 Appuhn ................. C11D 13/04 554/157
3,362,794 A * 1/1968 Bergman .................. C11B 3/06 196/46

(Continued)

FOREIGN PATENT DOCUMENTS

JP 06-279793 A 10/1994
KR 10-0789959 B1 1/2008

(Continued)

OTHER PUBLICATIONS

PCT International Search Report and Written Opinion for Application No. PCT/US2015/035093 mailed on Sep. 18, 2015, 14 Pages.

*Primary Examiner* — Huy-Tram Nguyen
(74) *Attorney, Agent, or Firm* — Moser Taboada

(57) ABSTRACT

The present invention is directed towards a method and apparatus for making soap. According to one embodiment, a soap making apparatus comprises a water vessel that holds water, an oil vessel that holds an oil mixture, a lye container that accepts enclosed lye capsules and a microcontroller that controls a mixture of ingredients that is discharged from the water vessel, oil vessel and lye vessel to produce one or more soap bars made.

15 Claims, 3 Drawing Sheets

(56) References Cited

U.S. PATENT DOCUMENTS

| | | | |
|---|---|---|---|
| 4,758,370 | A | 7/1988 | Jungermann et al. |
| 2010/0307927 | A1* | 12/2010 | Price ......................... C25B 3/00 205/462 |

FOREIGN PATENT DOCUMENTS

| | | | |
|---|---|---|---|
| KR | 10-1217359 | B1 | 12/2012 |
| KR | 10-2013-0125607 | A | 11/2013 |

* cited by examiner

METHOD AND APPARATUS FOR MAKING SOAP

CROSS-REFERENCES TO RELATED APPLICATIONS

This application claims the benefit of priority to U.S. Provisional Patent Application Ser. No. 62/010,762 filed on Jun. 11, 2014 and entitled "METHOD AND APPARATUS FOR MAKING SOAP", which is herein incorporated in its entirety by reference.

BACKGROUND

1. Field of the Invention

The present disclosure generally relates to a method and apparatus for making soap.

2. Description of the Related Art

The manufacture of soap is a dangerous and difficult process and has accordingly generally been limited to commercial production. However, recently, enthusiasts have begun making soap at home using well known manual processes. However, the known manual processes of making soap at home tend to be complex and potentially dangerous to the soap-maker. Often, these manual processes use lye in making soap. When lye is combined with high water temperatures, a chemical reaction takes place which could create a fatal hazard for the soap-maker.

Further, precise control over the ingredients in soap-making is required to make soap with the proper pH balance. Controlling temperatures of oils, chemicals and water at each stage in the process of making the soap becomes difficult and could result in incorrect acidity. Other undesirable properties may also emerge while attempting to create soap in a home laboratory. If the manufacture deviates from known processes even slightly, the soap-maker must use additional ingredients, wasting time and resources.

Accordingly, there exists a need for a method and apparatus for easing the process of making soap in a non-commercial setting.

SUMMARY

A soap making apparatus is provided substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

According to exemplary embodiments of the present invention, a soap making apparatus is provided. The soap making apparatus compartmentalizes the water, the lye and the oil vessels, keeping each separate from the other. The lye vessel is manually loaded with lye manually added lye capsules, enclosed so as to avoid direct skin contact. A microcontroller controls the temperature and release of each of the vessels independently. The microcontroller also controls the mixing portions of each element and is configurable modify quantities or proportions of lye, oil and water.

Figure 1:
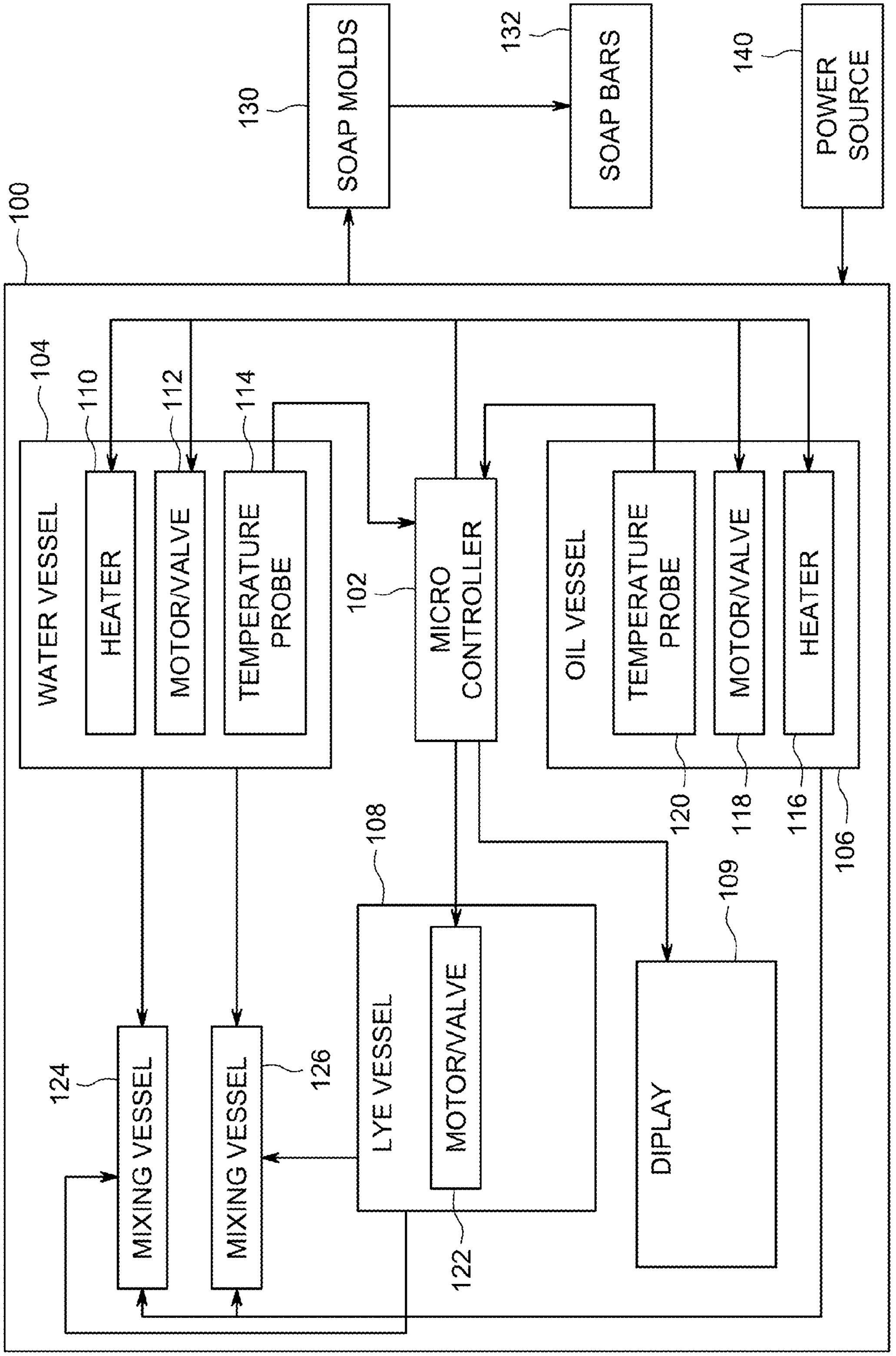
FIG. 1 is a block diagram of an apparatus for making soap in accordance with exemplary embodiments of the present invention.

FIG. 1 is a block diagram of a soap making apparatus (SMA) 100 in accordance with exemplary embodiments of the present invention. The SMA 100 comprises a microcontroller 102, a water vessel 104, an oil vessel 106, a lye vessel 108 and a display 109. The SMA 100 creates a mixture using the ingredients from the various vessels into mixing vessel 124 and mixing vessel 126 and discharges the mixture into one or more soap molds 130. The soap molds form the mixture into one or more soap bars 132. The SMA 100 is powered via a power source 140. Those of ordinary skill in the art will recognize that the power source may be any standard power source.

The water vessel 104 comprises a heater 110, a motor and valve 112 and a temperature probe 114. The oil vessel 106 comprises a heater 116, a motor/valve 118 and a temperature probe 120. The lye vessel 108 comprises a motor/valve 122. The microcontroller 102 controls the operation of the water vessel 104, the oil vessel 106, the lye vessel 108 and the display 109. The microcontroller 102 may be programmed with instructions on how and when to mix each ingredient: lye, water and oil, in the proper amounts to produce a mixture with the correct properties.

According to one embodiment, the microcontroller 102 controls the water vessel 104 to put a particular amount (e.g., 135 g) of water into mixing vessel 124. The microcontroller 102 then controls the lye vessel 108 to put an amount (e.g., 35 g) of lye into the mixing vessel 124. This creates an exothermic reaction and the temperature reaches approximately 180 F. The mixed water and lye in the first mixing vessel 124 are cooled to approximately 70 to 80 F for approximately 15-20 minutes. The temperature probe 114 monitors the temperature of the mixing vessel 124.

The oil vessel 106 is loaded with a proportion of palm oil and coconut oil, according to the user preference. In one embodiment, an amount (e.g., 68 g) of palm oil and an amount (e.g., 114 g) of coconut oil are dissolved in the oil vessel 106. The microcontroller controls the oil vessel 106 to be heated by the heater 116 to approximately 180 F and stirred by a stirring mechanism (known to those in the art) for approximately fifteen minutes. Once the mixture is heated to the desired temperature as determined by the temperature probe 120, adjuncts may be added to the mixture, such as color, aroma, or the like. The mixture in vessel 106 is combined with the mixture in mixing vessel 124 into mixing vessel 126. The final mixture is cooled to approximately to 70-80 F as determined by the temperature probe 120 and tracing occurs. Those of ordinary skill in the art will recognize that tracing generally occurs when the soap has reached emulsification or, in other words, tracing occurs when the oils and lye water are in solution and will no longer separate. Traces refer to visual cues that can be seen on the surface of the mixture and can be described as a trace of a slightly different color than the general mixture. Subsequently, the final mixture is directed towards the one or more soap molds 130 by the microcontroller 102, producing one or more soap bars 132.

Figure 2:
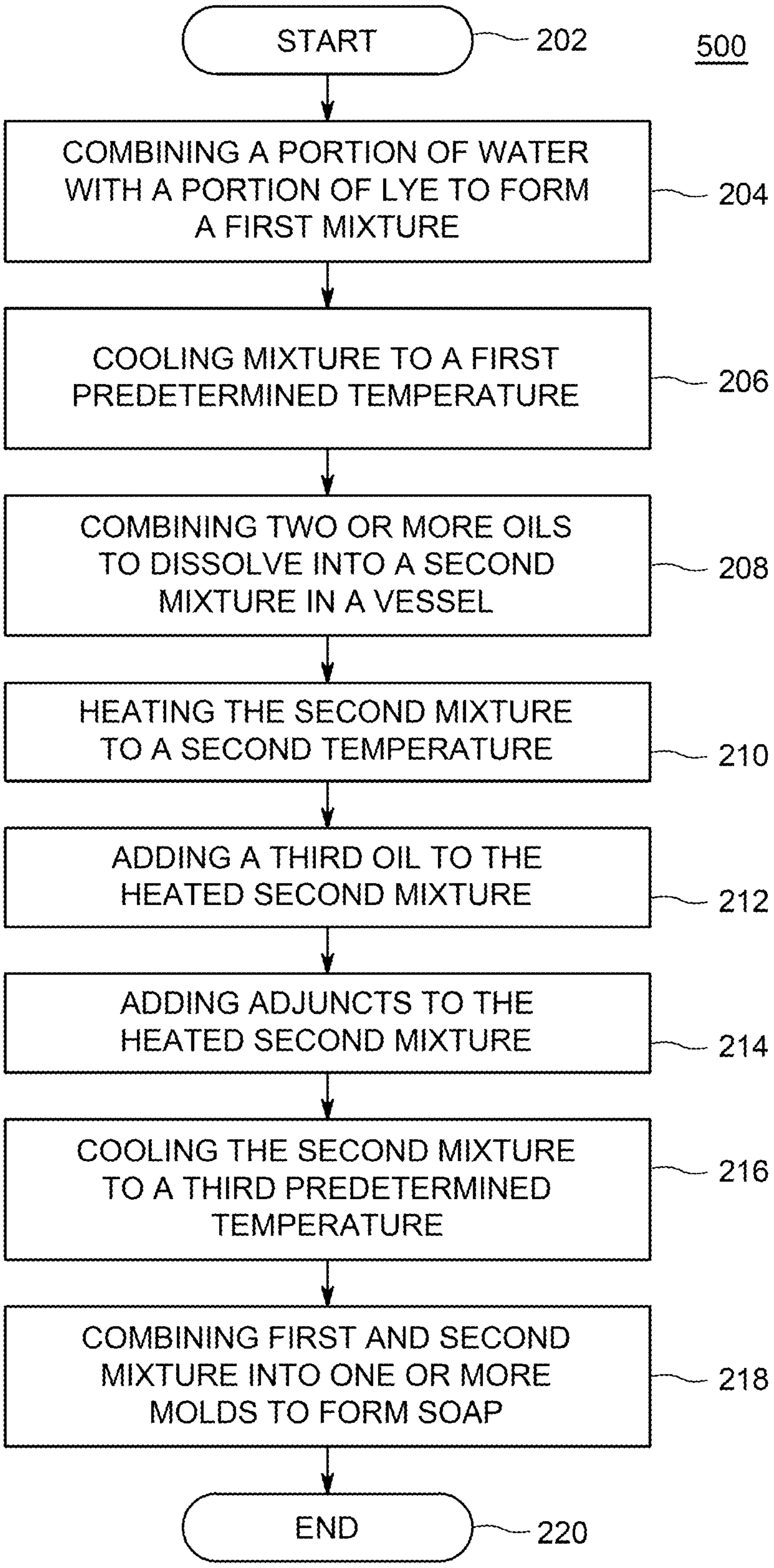
FIG. 2 is a flow diagram of a method for making soap in accordance with exemplary embodiments of the present invention.

FIG. 2 is a flow diagram of a method 200 for making soap in accordance with exemplary embodiments of the present invention. The method is controlled by the microcontroller 102 and performed by various components of the soap making apparatus 100.

The method begins at step 202 and proceeds to step 204. At step 204, a portion of water is combined with a portion of lye to form a first mixture. According to some embodiments, an amount (e.g., 135 g) of water is used and an amount (e.g., 35 g) of lye is used.

At step 206, the water and lye, collectively the first mixture is stored in a separate area and cooled from approximately 180° Fahrenheit to approximately 70-80° F. This process generally spans fifteen to twenty minutes, but may take more or less time according to the mixture quantities.

At step 208, two or more oils are combined to be dissolved into a second mixture in another vessel. For example, an amount (e.g., 68 g) of palm oil and an amount (114 g) of coconut oil are dissolved together. At step 210, the second mixture is heated to a second temperature. In exemplary embodiments, the second temperature is approximately 180° F., though this may differ based on quantities. The heating may take approximately 15 minutes of stirring of the second mixture. At step 212, a third oil, e.g. olive oil, is added to the heated second mixture. In some embodiments, an amount (e.g., 182 g) of olive oil is used. At step 214, adjuncts are added to the heated second mixture. The adjuncts comprise the various colors, scents, aromas, and other ingredients that can be used to customize the soap. At step 216, the second mixture is cooled to 70-80° F. by stirring the mixture for approximately 15-20 minutes. The first mixture and the second mixture are combined together at step 218 to form a final mixture, and the final mixture is poured into one or more soap molds. The soap molds are cooled to form soap bars. The method terminates at step 220.

Figure 3:
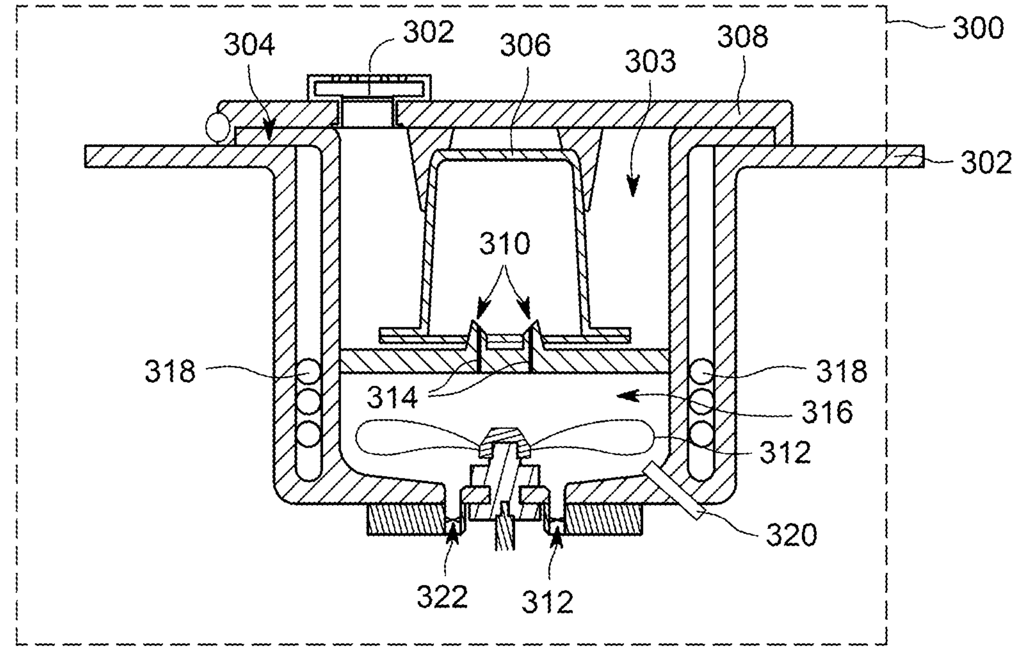
FIG. 3 is an illustration of a soap making apparatus, in accordance with exemplary embodiments of the present invention.

FIG. 3 is an illustration of a lye container 300, in accordance with exemplary embodiments of the present invention.

The lye container 300 comprises a vent 302, a lye cavity 303, containment vessel 304, an insertable/removable lye vessel 306, a lid 308, piercing mechanism 310, a stirring mechanism 312, one or more valves 314, a water chamber 316 and cooling coils 318. The lye container 300 fits into the soap making apparatus shown in FIG. 4. The vent 302 vents excess heat or other gases from the lye cavity 303. In some embodiments there may be one or more vents.

According to one embodiment, the lid 308 rotates off, exposing the lye cavity 303. Once the lid 308 exposes the lye cavity 303, a particular amount of water, as described above in reference to FIG. 2, is poured into the cavity. The water drains from the lye cavity 303 into the water chamber 316 via the one or more valves 314. In other embodiments, the valves 314 may be realized as small holes at the bottom of the lye cavity 303 which allow the water to fall through to the water chamber 316.

Once the particular amount of water is poured into the lye cavity 303, a lye vessel, e.g. lye vessel 306, is inserted, in some instances, up-side down, into the lye cavity 303. The lye vessel 306 may be shaped in the form of a pouch, cup, or other form. Those of ordinary skill in the art will recognize that the lye vessel 306 may be formed in any shape acceptable by design in the lye containment vessel 304 and is not limited to the particular shape shown in FIG. 3 and FIG. 4. According to one embodiment, the lye vessel 306 may have a foil or polyester top cover, or a cover made of any easily piercable, yet durable material. Similarly, in some embodiments, the lye containment vessel 304 is designed to fit various shapes of lye vessels to accommodate variations in size, structure, or the like. Those of ordinary skill in the art also recognize that the lye containment vessel 304 is designed to position the lye vessel 306 above the piercing mechanism 310. In some embodiments, guides are built into the lye containment vessel 304 to guide the lye vessel 306 into a proper position for operation of the soap making apparatus.

After the lye vessel 306 is inserted into the lye cavity in the correct position, the lid is closed and forces the lye vessel 306 to be pierced by the piercing mechanism 310. Once pierced, the lye vessel 306 excretes the lye contained therein, and the lye flows through the valves 314 into the water chamber 316. In this embodiment, the valves 314 are built into the piercing mechanism 310, however, as described above, the valves 314 may comprise a series of holes in the lye containment vessel 304, and the piercing mechanism 310 may pierce the lye vessel 306 on any of its sides, allowing the lye into the lye cavity 303.

The lye may then be drained through the series of holes into the water chamber 316. In some embodiments, the valves 314 may comprise feed tubes which allow the lye into the water chamber 316. In some embodiments, a switching mechanism is used to perform the piercing of the lye vessel 306, so that the piercing can take place after the lid is fully closed, or at a user's request.

The lye and water mixture in the water chamber 316 is stirred by the stirring mechanism 312 causing an exothermic reaction where the mixture rises to a temperature of approximately 180° F. and releases a gaseous mix. According to exemplary embodiments, the stirring mechanism has one or more blades, or may be replaced with a magnetic bead for mixing. Those of ordinary skill in the art will recognize that any mechanism which stirs the lye and water together may be used as the stirring mechanism 312.

Figure 4:
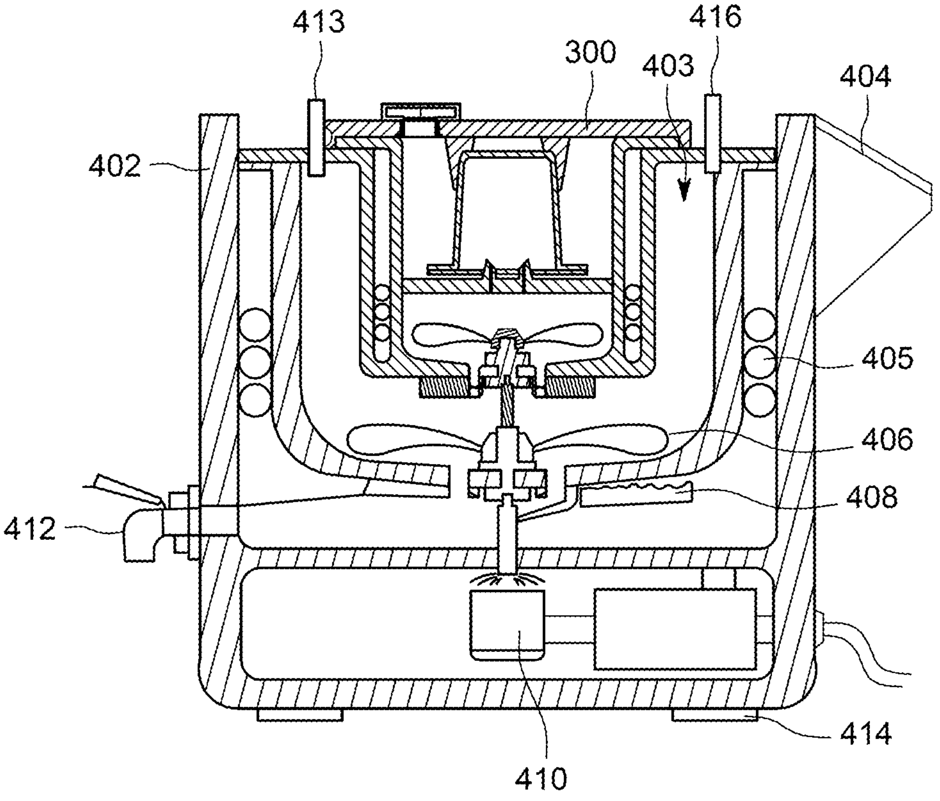
FIG. 4 illustrates a soap making apparatus in accordance with exemplary embodiments of the present invention.

The gaseous mix may be vented through holes between the lye containment vessel 304 and the water chamber 316 and vented out through the vent 302. In other embodiments, there may be a venting tube allowing for direct venting directly coupled from the water chamber 316 to the vent 302. The temperature of the mixture in the water chamber 316 is measured by a thermocoupler 320 and when the temperature is nearing 90° F., the thermocoupler may direct a microcontroller to slow down or shut off the stirring mechanism 312 entirely, enable the cooling coils 318 or cause a display (as shown in FIG. 4) to indicate that the lye/water mixture has cooled. Accordingly, the water and lye mixture may be cooled by the cooling coils 318 to approximately 90° F. In one embodiment, the cooling coils 318 are replaced by an inlet water pipe coupled to an external water source such as a water line, faucet, or the like. The inlet water pipe allows water to circulate around the water chamber 316, cooling the mixture in the water chamber 316 to the desired temperature.

FIG. 4 illustrates a soap making apparatus (SMA) 400 in accordance with exemplary embodiments of the present invention.

The SMA 400 comprises the lye container 300 shown in FIG. 3 and an outer soap vessel 402. The outer soap vessel 402 comprises a soap chamber 403, a control and display section 404, cooling coils 405, a stirring mechanism 406, a heating element 408 a motor 410 and an outlet 412 for soap molds. In exemplary embodiments of the SMA 400, the SMA 400 optionally comprises device feet 414. The SMA 400 is powered electrically via an AC power inlet.

The lye container 300 is designed to fit into the soap chamber 403 of the outer soap vessel 402. A user can first place soap ingredients into the soap chamber 403 before creating the lye and water mixture, or may be input while the lye mixture is being stirred via input 416. According to one embodiment, the lye and water mixture contained in the water chamber 316 is siphoned through valve 322 into the soap chamber 403 where it is mixed with other soap ingredients as described in reference to FIG. 2, when the lye container 300 is placed into the soap chamber 403.

The other soap ingredients are fed into the outer soap vessel via an input 416, or before the lye container 300 is inserted into the body of outer soap vessel 402. Optionally, the lye container can be initially removed from the SMA 400 and the soap ingredients, such as scents, oils and the like, may be directly poured into the soap chamber 403. Then, the lye container 300 is attached to the outer soap vessel 402 and the microcontroller opens the valves 322 of the lye container 300 permitting the lye and water mixture to mix with the soap ingredients.

The microcontroller then controls the stirring mechanism 406 to stir the lye and water mixture with the other soap ingredients. The heating element 408 heats the mixture up to a particular temperature as described in reference to FIG. 2 to liquefy all of the ingredients. A thermocoupler 413 measures the temperature and allows the microcontroller to act accordingly. Once the mixture has reached the desired temperature as determined by the thermocoupler 413 and cool-down has completed, the outlet 412 is opened by the microcontroller and the mixture is output at the outlet 412.

Those of ordinary skill in the art will recognize that the outlet 412 may be a spigot or the like and may output into various soap molds provided by the user. The various stages of the process may be displayed and/or controlled by control and display section 404. The motor 410 controls the stirring mechanism 406 which may optionally couple with the stirring mechanism 312, so they are controlled via a single motor.

While the invention has been described in conjunction with specific embodiments thereof, it is evident that alternatives, modifications and variations will be apparent to those skilled in the art in light of the foregoing description. Accordingly, it is intended to embrace all such alternatives, modifications and variations as fall within the spirit and broad scope of the described invention.

The invention claimed is:

1. A soap making apparatus comprising:

a water vessel that holds water;

an oil vessel that holds an oil mixture;

a lye container that accepts enclosed lye capsules, the lye container comprising:

a containment vessel;

an insertable and removable lye vessel containing the enclosed lye capsule;

a lid that covers the lye container;

a piercing mechanism;

a valve; and a vent that vents excess heat from the lye container, wherein upon closing the lid, the piercing mechanism pierces the enclosed lye capsule to excrete lye into the water vessel via the valve; and a microcontroller that controls a mixture of ingredients that is discharged from the water vessel, oil vessel and lye vessel to produce one or more soap bars made.

2. The soap making apparatus of claim 1, further comprising:

a first mixing vessel that receives the water and the lye as a first mixture; and a second mixing vessel that receives the oil mixture and the first mixture.

3. The soap making apparatus of claim 2, the lye container further comprising:

a motor; and a valve, coupled to the microcontroller, for releasing the lye into the first mixing vessel.

4. The soap making apparatus of claim 3, wherein the lye is released in a predetermined portion.

5. The soap making apparatus of claim 4, wherein the predetermined portion is approximately 35 g.

6. The soap making apparatus of claim 2, the water vessel further comprising:

a heater that heads the water;

a valve, coupled to the microcontroller, for releasing the water; and a temperature probe, coupled to the microcontroller and the valve, that signals the valve to open at a predetermined water temperature.

7. The soap making apparatus of claim 6, wherein the water is released from the water vessel via the valve into the first mixing vessel in a predetermined portion.

8. The soap making apparatus of claim 7, wherein the predetermined portion is approximately 135 g.

9. The soap making apparatus of claim 2, wherein the water is released first into the first mixing vessel, and then the lye is released into the first mixing vessel.

10. The soap making apparatus of claim 2, wherein the first mixture is cooled in the first mixing vessel to approximately 70° F. to 80° F. as measured by a temperature probe for approximately fifteen to twenty minutes.

11. The soap making apparatus of claim 10, wherein the oil mixture in the oil vessel is heated to approximately 180° F. and stirred for approximately 15 minutes by a heater and stirring mechanism controlled by the microcontroller.

12. The soap making apparatus of claim 11, wherein adjuncts are accepted in the oil mixture before the oil mixture and the first mixture are received in the second mixing vessel.

13. The soap making apparatus of claim 2, wherein the oil mixture and the first mixture are combined to produce a second mixture.

14. The soap making apparatus of claim 13, wherein the second mixture is cooled in the second mixing vessel by a heater to a predetermined temperature controlled by the microcontroller until tracing occurs.

15. The soap making apparatus of claim 14, wherein the predetermined temperature is approximately 70° F. to 80° F.

* * * * *